(12) United States Patent
Doo et al.

(10) Patent No.: US 10,411,242 B2
(45) Date of Patent: Sep. 10, 2019

(54) SECONDARY BATTERY

(71) Applicant: Samsung SDI Co., LTD., Yongin-si, Gyeonggi-do (KR)

(72) Inventors: Jae Gyun Doo, Yongin-si (KR); Hyun Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 381 days.

(21) Appl. No.: 14/989,639

(22) Filed: Jan. 6, 2016

(65) Prior Publication Data

US 2017/0084901 A1    Mar. 23, 2017

(30) Foreign Application Priority Data

Sep. 23, 2015 (KR) .................. 10-2015-0134381

(51) Int. Cl.
*H01M 2/26* (2006.01)
*H01M 10/04* (2006.01)
(Continued)

(52) U.S. Cl.
CPC ......... *H01M 2/263* (2013.01); *H01M 2/0404* (2013.01); *H01M 10/0431* (2013.01); (Continued)

(58) Field of Classification Search
CPC ............. H01M 2/263; H01M 10/0431; H01M 10/0422
See application file for complete search history.

(56) References Cited

U.S. PATENT DOCUMENTS 8,846,243 B2    9/2014    Ryu
9,012,053 B2    4/2015    Chun
(Continued)

FOREIGN PATENT DOCUMENTS

EP          2866279 A1    4/2015
KR    10-2008-0009351 A    1/2008
(Continued)

OTHER PUBLICATIONS

EPO Extended Search Report dated Nov. 21, 2016, for corresponding European Patent Application No. 16189211.2 (7 pages).

*Primary Examiner* — Jonathan G Leong
(74) *Attorney, Agent, or Firm* — Lewis Roca Rothgerber Christie LLP

(57) ABSTRACT

A secondary battery includes an electrode assembly including a first electrode, a separator, and a second electrode, sequentially stacked and wound. The secondary battery further includes a series of first electrode tabs electrically connected to the first electrode and extending to an outside of the electrode assembly. The series of first electrode tabs includes inner and outer tabs respectively located proximate to and distal to the center axis of the electrode assembly. The outer tab is connected to the inner tab at the outside of the electrode assembly. A length along the inner tab from a point where the inner tab extends from the electrode assembly to a point where the inner tab is connected to the outer tab is different from a length along the outer tab from a point where the outer tab extends from the electrode assembly to a point where the outer tab is connected to the inner tab.

14 Claims, 12 Drawing Sheets

(51) Int. Cl.
*H01M 2/04* (2006.01)
*H01M 4/66* (2006.01)
*H01M 4/583* (2010.01)
*H01M 4/48* (2010.01)

(52) U.S. Cl.
CPC .............. *H01M 4/48* (2013.01); *H01M 4/583* (2013.01); *H01M 4/661* (2013.01); *H01M 4/669* (2013.01); *H01M 10/0422* (2013.01); *H01M 2220/30* (2013.01)

(56) References Cited

U.S. PATENT DOCUMENTS

| | | | |
|---|---|---|---|
| 2007/0117011 A1* | 5/2007 | Myerberg | B32B 15/017 |
| | | | 429/164 |
| 2009/0092896 A1* | 4/2009 | Koh | H01M 2/0207 |
| | | | 429/163 |
| 2011/0104541 A1 | 5/2011 | Ahn et al. | |
| 2011/0250488 A1 | 10/2011 | Park | |
| 2012/0009450 A1* | 1/2012 | Chun | H01M 2/023 |
| | | | 429/94 |
| 2012/0177963 A1 | 7/2012 | Lee et al. | |
| 2014/0087245 A1 | 3/2014 | Lee et al. | |
| 2015/0194639 A1 | 7/2015 | Jeoung et al. | |
| 2015/0236317 A1 | 8/2015 | Lee et al. | |

FOREIGN PATENT DOCUMENTS

| | | |
|---|---|---|
| KR | 10-2012-0006389 A | 1/2012 |
| KR | 10-2012-0133026 A | 12/2012 |
| KR | 10-2013-0076838 A | 7/2013 |
| KR | 10-2015-0000159 A | 1/2015 |
| KR | 10-2015-0081730 A | 7/2015 |

\* cited by examiner

SECONDARY BATTERY

CROSS-REFERENCE TO RELATED APPLICATION

This application claims priority to and the benefit of Korean Patent Application No. 10-2015-0134381, filed on Sep. 23, 2015, in the Korean Intellectual Property Office, the entire content of which is incorporated herein by reference in its entirety.

BACKGROUND

1. Field

An aspect of the present disclosure relates to a secondary battery.

2. Description of the Related Art

In general, secondary batteries are batteries capable of being repeatedly charged and discharged. The secondary batteries may be charged by using, as energy sources, not only energy from the existing power systems but also solar energy and renewable energy systems. The secondary batteries are used as energy sources for not only electronic devices such as cellular phones, notebook computers, and camcorders but also automobiles and large-sized facilities requiring power supply.

A plurality of secondary batteries may be connected in series and/or in parallel to implement a high-output and/or high-capacity power storage device, when necessary. The power storage device may further include a controller for controlling charging and/or discharging of the secondary batteries and preventing over-charging and/or over-discharging of the secondary batteries, when necessary.

SUMMARY

Aspects of embodiments of the present disclosure are directed toward a secondary battery having improved output characteristics.

Aspects of embodiments of the present disclosure are also directed toward a secondary battery having improved durability.

According to an embodiment of the present disclosure, there is provided a secondary battery including: an electrode assembly including a first electrode, a separator, and a second electrode, which are sequentially stacked and wound; a series of first electrode tabs electrically connected to the first electrode, the series of first electrode tabs extending to an outside of the electrode assembly, wherein the series of first electrode tabs includes: an inner tab located proximate to a center axis of the electrode assembly; and an outer tab located distal to the center axis of the electrode assembly relative to the inner tab, the outer tab being connected to the inner tab at the outside of the electrode assembly, wherein a length along the inner tab from a point at which the inner tab extends from the electrode assembly to a point at which the inner tab is connected to the outer tab is different from a length along the outer tab from a point at which the outer tab extends from the electrode assembly to a point at which the outer tab is connected to the inner tab.

The inner tab and the outer tab may be aligned at a same side relative to the center axis of the electrode assembly.

The inner tab and the outer tab extend from the electrode assembly, are bent along an inner radial direction of the electrode assembly, are bent in an opposite radial direction, and then connected to each other.

The length along the inner tab from the point at which the inner tab extends from the electrode assembly to the point at which the inner tab is connected to the outer tab may be shorter than the length along the outer tab from the point at which the outer tab extends from the electrode assembly to the point at which the outer tab is connected to the inner tab.

The inner tab and the outer tab may have different widths from each other.

The electrode assembly may further include at least one second electrode tab electrically connected to the second electrode, the at least one second electrode tab extending to the outside of the electrode assembly.

According to another embodiment of the present disclosure, there is provided a secondary battery including: an electrode assembly including a first electrode, a separator, and a second electrode, which are sequentially stacked and wound; a case including a cap assembly electrically connected to the first electrode, the case accommodating the electrode assembly therein; a series of first electrode tabs electrically connected to the first electrode, the series of first electrode tabs extending to an outside of the electrode assembly to be electrically connected to the cap assembly, wherein the series of first electrode tabs includes: an inner tab located proximate to a center axis of the electrode assembly; and an outer tab located distal to the center axis of the electrode assembly relative to the inner tab, the outer tab being connected to the inner tab at the outside of the electrode assembly, wherein a length along the inner tab from a point at which the inner tab extends from the electrode assembly to a point at which the inner tab is connected to the outer tab is different from a length along the outer tab from a point at which the outer tab extends from the electrode assembly to a point at which the outer tab is connected to the inner tab.

At least one of the inner tab and the outer tab may be fixed to the cap assembly.

The at least one of the inner tab and the outer tab that is fixed to the cap assembly may include an extending end portion extending from an area where the inner tab and the outer tab are connected to each other.

The inner tab and the outer tab may extend between the electrode assembly and the cap assembly, and wherein each of the inner tab and the outer tab may include bending areas between points at which the inner tab and the outer tab extend from the electrode assembly and a point at which the inner and outer tab are connected to each other.

The cap assembly may be spaced apart from the electrode assembly and above the electrode assembly. The point at which the inner and outer tabs are connected to each other may be located above the bending areas of the inner tab and the outer tab.

The cap assembly may include a cap-up; and a current interrupt device provided between the electrode assembly and the cap-up and electrically connected to the cap-up. At least one of the inner tab and the outer tab may be fixed to the current interrupt device.

The inner tab and the outer tab may have different widths from each other.

One tab of the inner tab and the outer tab that has a wider width than the other tab may be fixed to the cap assembly.

The case may further include a can forming an exterior of the case, the can accommodating the electrode assembly therein, and the can having an opening to which the cap assembly is coupled. The electrode assembly may further include at least one second electrode tab electrically connected to the second electrode, the at least one second electrode tab extending to the outside of the electrode assembly to be electrically connected to the can.

The inner tab and the outer tab may be aligned at a same side with respect to the center axis of the electrode assembly, and the inner tab and the outer tab may overlap each other.

The bending areas may include a first bending area bent in an inner radial direction of the electrode assembly, the first bending area extending from the electrode assembly; and a second bending area spaced apart from the first bending area and bent toward the point at which the inner tab and the outer tab are connected to each other.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
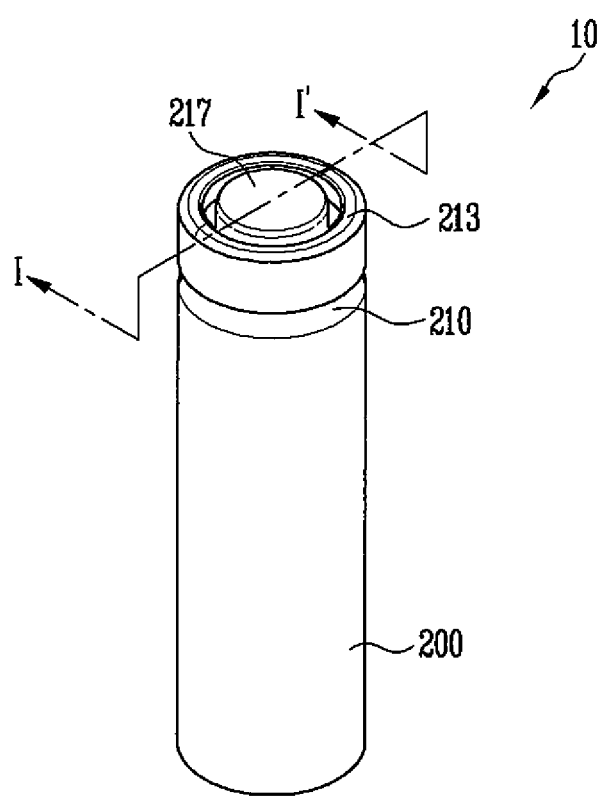
FIG. 1 is a perspective view of a secondary battery according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Hereinafter, exemplary embodiments will be described in more detail with reference to the accompanying drawings, so that the scope of the present disclosure can be easily embodied by those skilled in the art. Secondary batteries mentioned in the present disclosure may be secondary batteries having any configuration capable of being charged and discharged.

Figure 2:
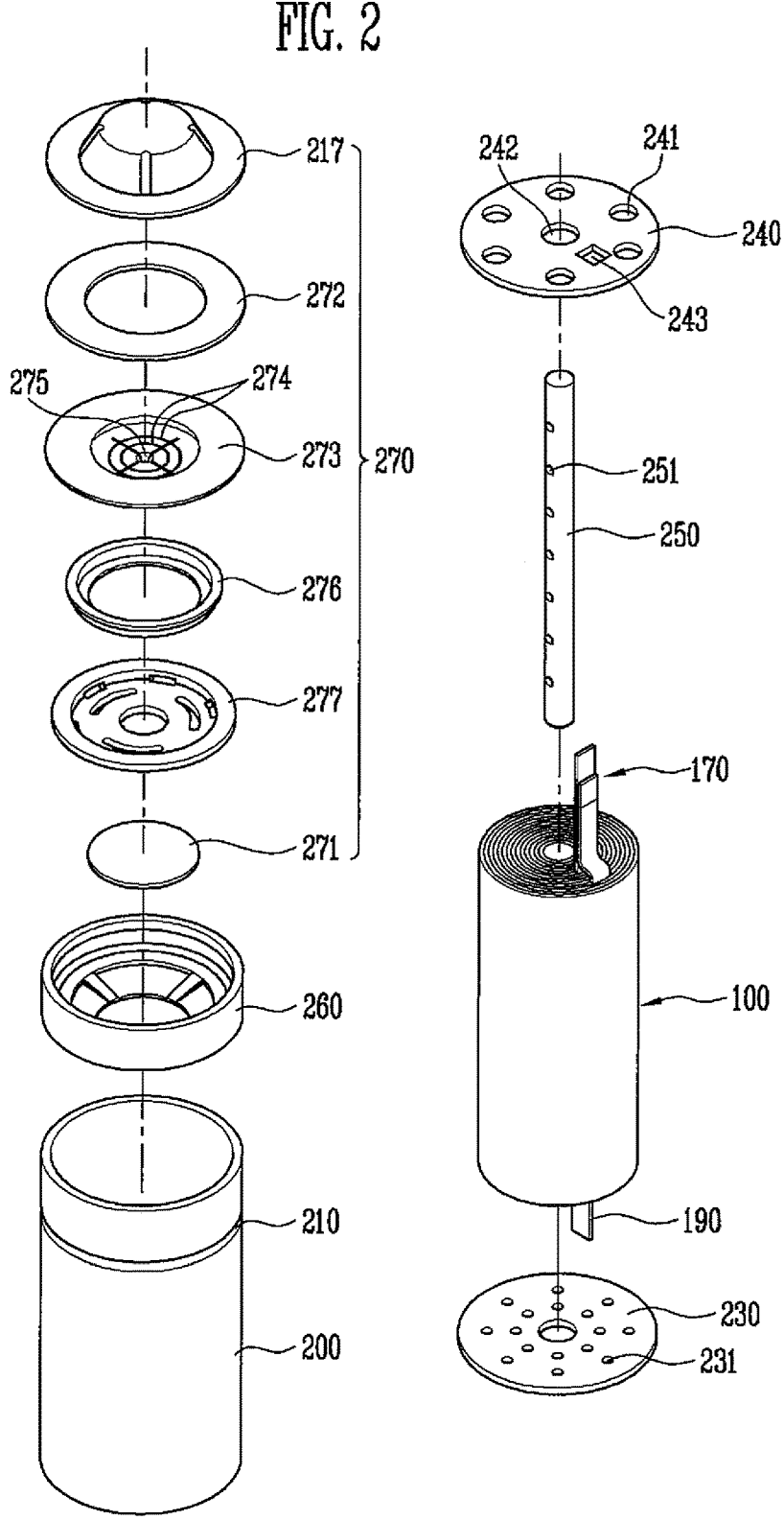
FIG. 2 is an exploded perspective view of the embodiment of FIG. 1.

FIG. 1 is a perspective view showing an external appearance of a secondary battery according to an embodiment of the present disclosure. FIG. 2 is an exploded perspective view of the embodiment of the secondary battery in FIG. 1.

The secondary battery 10 according to the embodiment of the present disclosure includes an electrode assembly 100, a plurality of insulating plates 230 and 240, a center pin 250, a gasket 260, and a case. The case includes a can 200 accommodating the electrode assembly 100 therein, and a cap assembly sealing the can together with the gasket 260.

Figure 4:
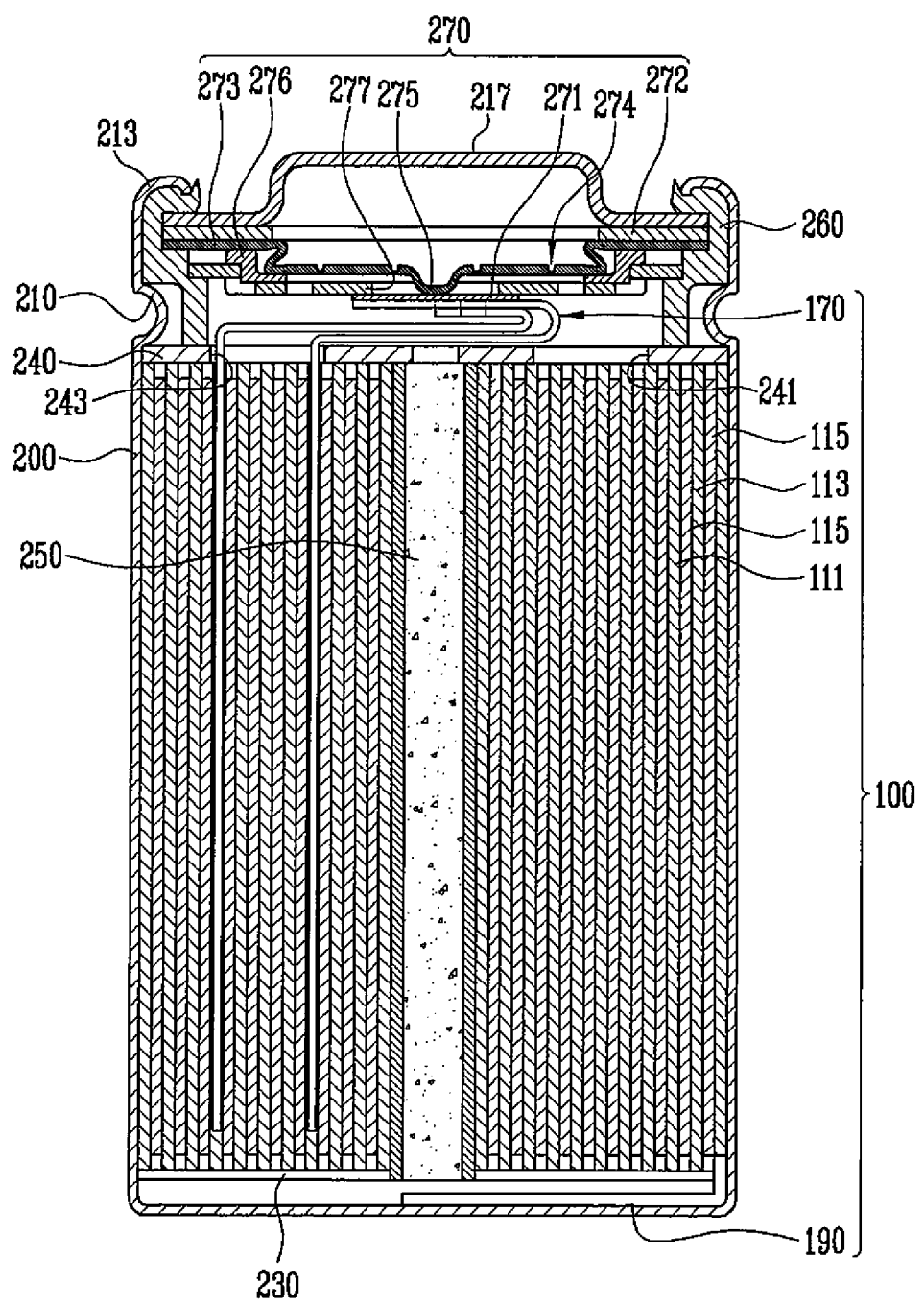
FIG. 4 is a sectional view taken along line I-I' of the embodiment of FIG. 1.

The electrode assembly 100 includes first and second electrodes 113 and 111 (see FIG. 4) and a separator 115 (see FIG. 4). The separator 115 is interposed between the first and second electrodes 113 and 111. The first and second electrodes 113 and 111 have different polarities from each other. If one electrode has a positive polarity, the other electrode has a negative polarity. The first electrode 113, the separator 115, and the second electrode 111 are sequentially stacked and then wound.

The electrode assembly 100 includes a plurality of first electrode tabs 170 electrically connected to the first electrode 113 and one second electrode tab 190 electrically connected to the second electrode 111. Energy generated from the electrode assembly 100 is transmitted to the outside by the first and second electrode tabs 170 and 190. The first and second electrode tabs 170 and 190 include a conductive material, and, for example, may include nickel (Ni) or Ni alloy.

The can 200 is a cylinder having one open end. The cylinder is formed with a space (e.g., a cavity or a chamber) in which the electrode assembly 100 is accommodated. In the illustrated embodiment, the second electrode tab 190 is welded to a bottom surface of the can 200, so that the can 200 can function as an electrode terminal. The can 200 may be formed of stainless steel, aluminum, or equivalents thereof, but the present disclosure is not limited thereto.

The plurality of insulating plates 230 and 240 include a first insulating plate 240 provided at a side where the electrode assembly 100 faces an opening of the can 200, and a second insulating plate 230 provided at a side where the electrode assembly 100 faces a surface opposite the opening of the can 200, e.g., the bottom surface of the can 200. An electrical short between the electrode assembly 100 and the can 200 is prevented or blocked by the first and second insulating plates 240 and 230.

The first insulating plate 240 may be provided with a plurality of holes 241 through which an electrolyte is injected into the electrode assembly 100. In addition, the first insulating plate 240 may be provided with an opening (e.g., a hole) 243 through which the plurality of first electrode tabs 170 extending from the electrode assembly 100 pass. The second insulating plate 230 is provided with a plurality of holes 231 to minimize or at least reduce the space occupied by (i.e., the space decreased by) the second insulating plate 230, thereby minimizing or at least decreasing the reduction in the amount of the electrolyte to be injected.

The center pin 250 is provided on the center axis of the electrode assembly 100 to prevent the the electrode assembly from unwinding. The center pin 250 may be a cylindrical rod having a central opening formed therein (i.e., the center pin 250 may be hollow), and one end of the center pin 250 may press the second electrode tab 190 against the can 200 such that the second electrode tab 190 may be coupled (e.g., adhered) to the can 200.

When a central opening is formed in the center pin 250 (i.e., the center pin 250 is hollow), the hollow center pin 250 may function as a flow path for gas generated from the electrode assembly 100. The first insulating plate 240 is provided with a hole 242 formed at a central portion thereof. The hole 242 in the first insulating plate 240 corresponds to the center pin 250, so that gas may be exhausted through the hole 242.

The center pin 250 may be provided with a plurality of holes 251 formed along a length thereof (e.g., at a side surface thereof) so as to facilitate immersion of the center pin 250 in the electrolyte and to permit the smooth exhaustion of the gas generated from the electrode assembly 100.

An inwardly bent clamping portion 213 (FIG. 1) is formed at an edge (e.g., along a periphery) of the opening of the can 200. The clamping portion 213 pressurizes (e.g., presses against) the cap assembly 270, thereby increasing the fastening force of the cap assembly 270. The can 200 is provided with an inwardly convex bead 210 between the opening and the electrode assembly 100. The internal diameter of the bead 210 is smaller than the external diameter of the electrode assembly 100 so that the electrode assembly 100 is fixed within the can 200 (i.e., the bead 210 is configured to prevent the electrode assembly 100 from moving within the can 200).

The cap assembly 270 includes a cap-up 217 serving as an electrode terminal and a current interrupt device provided between the cap-up 217 and the electrode assembly 100. The current interrupt device includes a positive temperature coefficient member 272, a vent 273, an insulating member 276, a cap-down 277, and a plate 271, which are sequentially stacked in a direction facing the electrode assembly 100. However, the current interrupt device is merely an embodiment of the present disclosure, and the present disclosure is not limited thereto. The current interrupt device may be any configuration capable of interrupting current when an abnormal current flows and capable of discharging gas when the internal pressure of the battery increases.

The positive temperature coefficient member 272 interrupts current when an overcurrent flows through the cap assembly 270. The vent 273 includes a protruding portion 275 provided at the center thereof. The protruding portion 275 protrudes toward a hole provided at the center of the cap-down 277. The protruding portion 275 passes entirely through or substantially entirely through the hole provided at the center of the cap-down 277. Thus, the protruding portion 275 is configured to contact the plate 271 (i.e., the protruding portion 275 is configured to protrude into the hole in the cap-down 277 and contact a portion of the plate 271 below the hole in the cap-down 277).

The cap-down 277 is provided with a hole serving as a path such that, when a pressure in the secondary battery increases, the pressure can act on the vent 273. The plate 271 is closely connected (e.g., adhered) to the cap-down 277 between the electrode assembly 100 and the cap-down 277 to stop (e.g., cover) the hole provided at the center of the cap-down 277. The plate 271 may be electrically connected to the protruding portion 275 of the vent 273 through welding or the like. The vent 273 and the cap-down 277 are insulated from each other by the insulating member 276 provided between the vent 273 and the cap-down 277.

The vent 273 is provided with circular and cross-shaped grooves 274 formed around the protruding portion 275. If the pressure of the secondary battery increases as gas is generated inside the secondary battery, the protruding portion 275 of the vent 273 moves toward the cap-up 217. As the vent 273 is deformed as described above, a connecting portion between the plate 271 and the protruding portion 275 comes off (e.g., breaks off), or a portion of the plate 271 is broken, thereby interrupting electrical flow through the cap assembly 270. If the pressure of the battery continuously increases, gas is exhausted to the outside as the grooves 274 are ruptured.

The gasket 260 seals between the opening of the can 200 and the cap assembly 270. The gasket 260 surrounds the outer circumference of the cap assembly 270 to insulate between the can 200 and the cap-up 217 and the other components of the cap assembly 270. The gasket 260 is made of a material having insulating properties and elasticity.

The plurality of first electrode tabs 170 are electrically connected to each other. In addition, any one of the plurality of first electrode tabs 170 is electrically connected to the plate 271 or the cap-down 277. This will be described in further detail below with reference to FIGS. 1 to 5.

Figure 3:
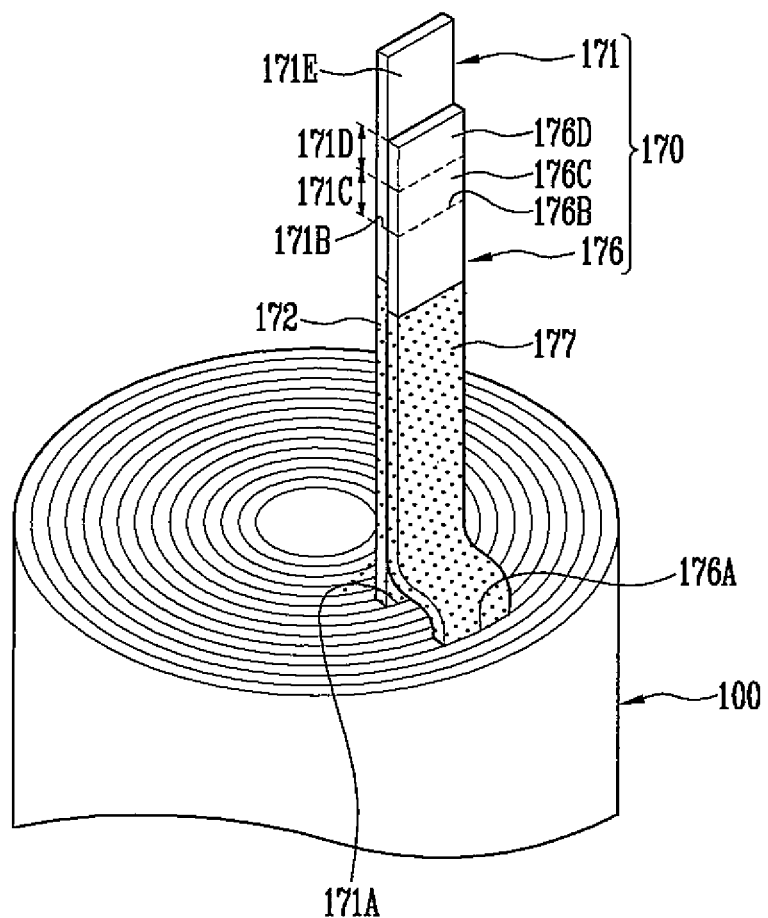
FIG. 3 is an enlarged perspective view of a plurality of first electrode tabs provided in the embodiment of FIG. 1.
Figure 5:
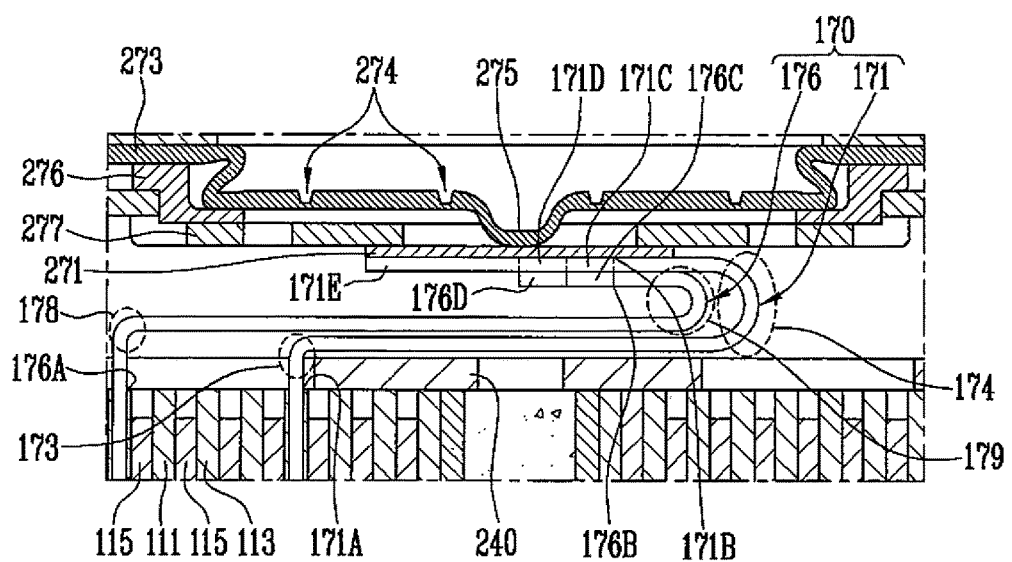
FIG. 5 is an enlarged sectional view showing a configuration in which the plurality of first electrode tabs and a cap assembly are connected to each other in FIG. 4.

For convenience of illustration, FIG. 3, which is an enlarged perspective view of the plurality of first electrode tabs 170 extending from the electrode assembly 100, shows the plurality of first electrode tabs 170 before being connected to the cap assembly 270. FIG. 4 is a sectional view taken along line I-I' of the embodiment of FIG. 1. FIG. 5 is an enlarged sectional view showing a portion at which the plurality of first electrode tabs 170 and the cap assembly 270 are electrically connected to each other in FIG. 4.

The plurality of first electrode tabs 170 includes an inner tab 171 located close to (e.g., proximate to) the center axis of the electrode assembly 100 and an outer tab 176 offset from or distal to (e.g., located distant from) the center axis of the electrode assembly 100. In other words, the inner tab 171 is located relatively farther from the outer circumference of the electrode assembly 100, and the outer tab 176 is located relatively closer to the outer circumference of the electrode assembly 100.

The terms "inner tab" and "outer tab" are merely defined as the outer tab is located relatively more distant than the inner tab, based on the center axis of the electrode assembly 100. Therefore, the present disclosure is not limited by the terms.

The inner tab 171 and the outer tab 176 are aligned at one side, based on the center axis of the electrode assembly 100. In other words, the inner tab 171 and the outer tab 176 are aligned at the same side, based on the center pin 250. The inner tab 171 and the outer tab 176 are aligned such that their portions extending to the outside from the electrode assembly overlap each other. The inner tab 171 and the outer tab 176 may have the same width.

Each of the inner tab 171 and the outer tab 176 is connected to a non-coating portion of the first electrode 113 and extends to the outside of the wound electrode assembly 100. The first electrode 113 is provided with a sheet-shaped current collector partially coated with an active material layer. A portion of the first electrode 113 that is not coated with the active material layer is defined as the non-coating portion.

The current collector of the first electrode 113 is a metal thin film, and may include at least one material selected from the group consisting of stainless steel, nickel, copper, aluminum, and alloys thereof. In an embodiment, when the first electrode 113 is a positive electrode and the second electrode 111 is a negative electrode, the active material layer of the first electrode 113 may include a positive electrode active material. The positive electrode active material includes at least one of carbon, graphite, and silicon. However, the present disclosure is not limited thereto, and any suitable positive electrode active material may be used without limitation.

In another embodiment, when the first electrode 113 is a negative electrode and the second electrode 111 is a positive electrode, the active material layer of the first electrode 113 may include a negative electrode active material. The negative electrode active material includes an oxide containing lithium. However, the present disclosure is not limited thereto, and any suitable negative electrode active material may be used without limitation.

The length along the inner tab 171 from a point of the inner tab 171 at which the inner tab 171 extends out from the electrode assembly 100 (e.g., a point on the inner tab 171 that is outside the electrode assembly 100 and adjacent the electrode assembly 100) (hereinafter, referred to as an 'extraction point of the inner tab') to a point of the inner tab 171 connected to the outer tab 176 (hereinafter, referred to as a 'connection point of the inner tab') is different from the length along the outer tab 176 from a point of the outer tab 176 at which the outer tab 176 extends out from the electrode assembly 100 (e.g., a point on the outer tab 176 that is outside the electrode assembly 100 and adjacent the electrode assembly 100) (hereinafter, referred to as an 'extraction point of the outer tab') to a point of the outer tab 176 connected to the inner tab 171 (hereinafter, referred to as a 'connection point of the outer tab'). Referring to FIGS. 3 to 5, in this embodiment, the length from the extraction point 171A of the inner tab to the connection point 171B of the inner tab is shorter than the length from the extraction point 176A of the outer tab 176 to the connection point 176B of the outer tab 176.

Each of the inner tab 171 and the outer tab 176 extends from the electrode assembly 100 to a space between the electrode assembly 100 and the cap assembly 270. The space between the electrode assembly 100 and the cap assembly 270 may be at least partially surrounded by the gasket 260.

As illustrated in FIGS. 4-5, the inner tab 171 and the outer tab 176 are bent in a first direction toward the inside of the circumference of the electrode assembly 100 by passing through the center axis of the electrode assembly 100, bent again in a second direction opposite the first direction to extend toward the circumference of the electrode assembly 100, and then connected to each other. That is, the inner tab 171 and the outer tab 176 are bent twice between the extraction points 171A and 176A and the connection points 171B and 176B.

In the embodiment illustrated in FIG. 5, the inner tab 171 is provided with inner tab bending areas 173 and 174 between the extraction point 171A of the inner tab and the connection point 171B of the inner tab. The inner tab bending areas include a first bending area 173 adjacent to the extraction point 171A of the inner tab and a second bending area 174 adjacent to the connection point 171B of the inner tab.

The first bending area 173 of the inner tab is defined as an area in which the inner tab 171 is bent in an inner radial direction of the electrode assembly 100 while extending out from the electrode assembly 100. The second bending area 174 of the inner tab is defined as an area in which the inner tab 171 further extends from the first bending area 173 and then is bent to almost 180 degrees in the opposite direction (e.g., an outer radial direction). The inner tab 171 further extends from the second bending area to reach the connection point 171B of the inner tab.

The outer tab 176 is provided with outer tab bending areas 178 and 179 between the extraction point 176A of the outer tab and the connection point 176B of the outer tab. The outer tab bending areas include a first bending area 178 adjacent to the extraction point 176A of the outer tab and a second bending area 179 adjacent to the connection point 176B of the outer tab.

The first bending area 178 of the outer tab is defined as an area in which the outer tab 176 is bent in an inner radial direction of the electrode assembly 100 while extending out from the electrode assembly 100. The second bending area 179 of the outer tab is defined as an area in which the outer tab further extends from the first bending area 178 and then is bent to almost 180 degrees in the opposite direction (e.g., an outer radial direction). The outer tab 176 further extends from the second bending area 179 to reach the connection point 176B of the outer tab.

Referring to FIG. 5, the second bending area 174 of the inner tab 171 and the second bending area 179 of the outer tab 176 may be spaced apart from each other in the radial direction of the electrode assembly 100. The second bending areas 174 and 179 of the inner and outer tabs 171 and 176 are located under the connection points 171B and 176B of the inner and outer tabs 171 and 176, respectively. Here, the concepts "up/down" are relative to each other and defined based on a case where the secondary battery 10 is disposed such that the cap assembly 270 is located over the electrode assembly 100. The cap assembly 270 and the electrode assembly 100 are spaced apart from each other such that a space is formed therebetween.

As described above, the length from the extraction point 171A to the connection point 171B of the inner tab 171, which is relatively closer to the center axis of the electrode assembly than the outer tab 176, is shorter than the length from the extraction point 176A to the connection point 176B of the outer tab 176, which facilitates maintaining the bending shape of the plurality of first electrode tabs. Also, in the illustrated embodiment, the plurality of first electrode tabs are bent twice, thereby improving impact resistance of the first electrode tabs.

As illustrated in FIG. 3, the inner tab 171 includes a connection area 171C further extending from the connection point 171B of the inner tab. The connection area 171C of the inner tab 171 is joined and fixed to the outer tab 176. The outer tab 176 includes a connection area 176C (shown between the dashed lines) further extending from the connection point 176B of the outer tab. The connection area 176C of the outer tab 176 is joined and fixed to the connection area 171C of the inner tab 171. The connection area 171C of the inner tab and the connection area 176C of the outer tab are located at regions that do not reach the center axis of the cap assembly 270. That is, the inner tab 171 and the outer tab 176 are joined together before each of the inner tab 171 and the outer tab 176, which are bent twice and extend in the inner radial direction, passes through the center axis of the cap assembly 270. In the illustrated embodiment, the center axis of the cap assembly 270 is an axis corresponding to the portion at which the protruding portion 275 of the vent 273 is located.

The connection area 171C of the inner tab and the connection area 176C of the outer tab may be joined to each other through welding. For example, the connection area 171C of the inner tab and the connection area 176C of the outer tab may be joined through ultrasonic welding, but the welding method is not limited thereto.

The inner tab 171 includes extending end portions 171D and 171E further extending from the connection area 171C of the inner tab. The outer tab 176 includes extending end portion 176D further extending from the connection area 176C of the outer tab. The extending end portions 171D and 171E of the inner tab extend longer than the extending end portion 176D of the outer tab and are fixed to the cap assembly 270. The extending end portion 171E of the inner tab extends in the radial direction further toward the outer circumference of the electrode assembly and passes through the center axis of the cap assembly 270.

Specifically, the extending end portion of the inner tab 171 includes a portion 171D overlapped with the extending end portion 176D of the outer tab and a cap assembly connection portion 171E further extended from the overlapped portion 171D to be joined with the cap assembly 270. The cap assembly connection portion 171E does not overlap with the outer tab 176 but is joined and fixed to the plate 271 or the cap-down 277. In FIG. 5, it is illustrated that the cap assembly connection portion 171E is connected to the plate 271, but the present disclosure is not limited thereto.

The cap assembly connection portion 171E of the inner tab is positioned opposite the connection area 171C of the inner tab with respect to the center axis of the cap assembly 270 (e.g., the center axis is interposed between the cap assembly connection portion 171E and the connection area 171C of the inner tab). That is, the portion of the inner tab 171 joined with the outer tab 176 and the portion of the inner tab 171 joined with the cap assembly 270 are located at opposite sides with respect to the center axis of the cap assembly 270. The extending end portion 176D of the outer tab 176 is overlapped by the inner tab, and is not joined with the cap assembly 270. In one or more embodiments, the portion 171C of the inner tab 171 joined with the outer tab 176 and the portion 171E of the inner tab 171 joined with the cap assembly 270 may be located at one side (i.e., the same side) with respect to the center axis of the cap assembly 270.

As another embodiment, the extending end portion 176D of the outer tab may not be provided. In other words, the connection area (e.g., the welding area) between the outer tab and inner tab may be formed up to the end portion of the outer tab. In this case, the inner tab may extend from a portion connected to the end portion of the outer tab and be joined with the cap assembly.

The inner tab 171 may further include an insulating layer 172 coated over the front and rear of a portion of the inner tab 171 extending from the electrode assembly 100. Similarly, the outer tab 176 may further include an insulating layer 177 coated over the front and rear of a portion of the outer tab 176 extending from the electrode assembly 100. The plurality of first electrode tabs 171 and 176 and the second electrode 111 may be insulated from each other by the insulating layers 172 and 177.

Figure 6:
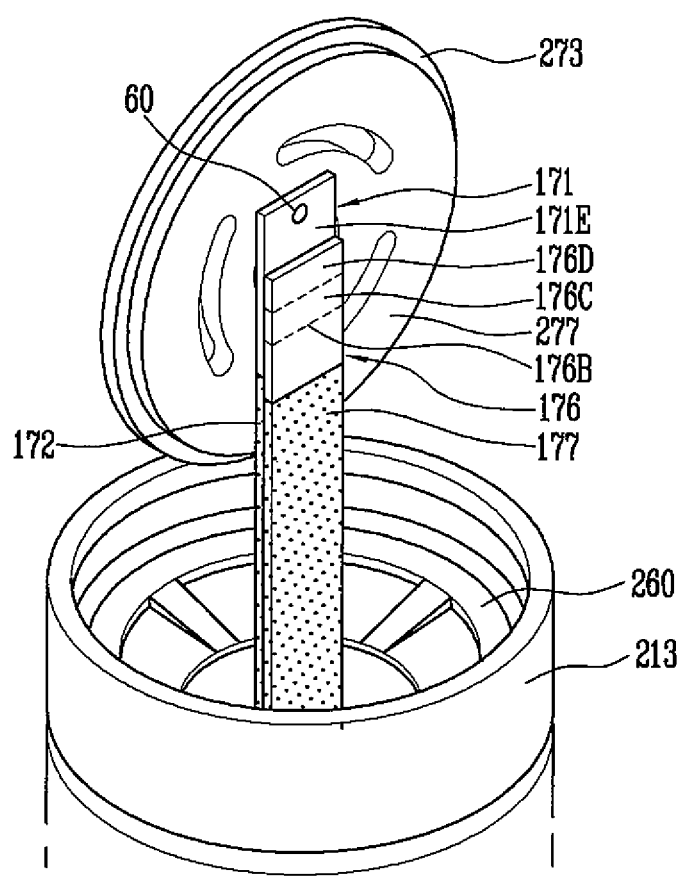
FIG. 6 is a perspective view showing a state in which the plurality of first electrode tabs provided in the embodiment of FIG. 1 and the cap assembly are joined with each other.
Figure 7:
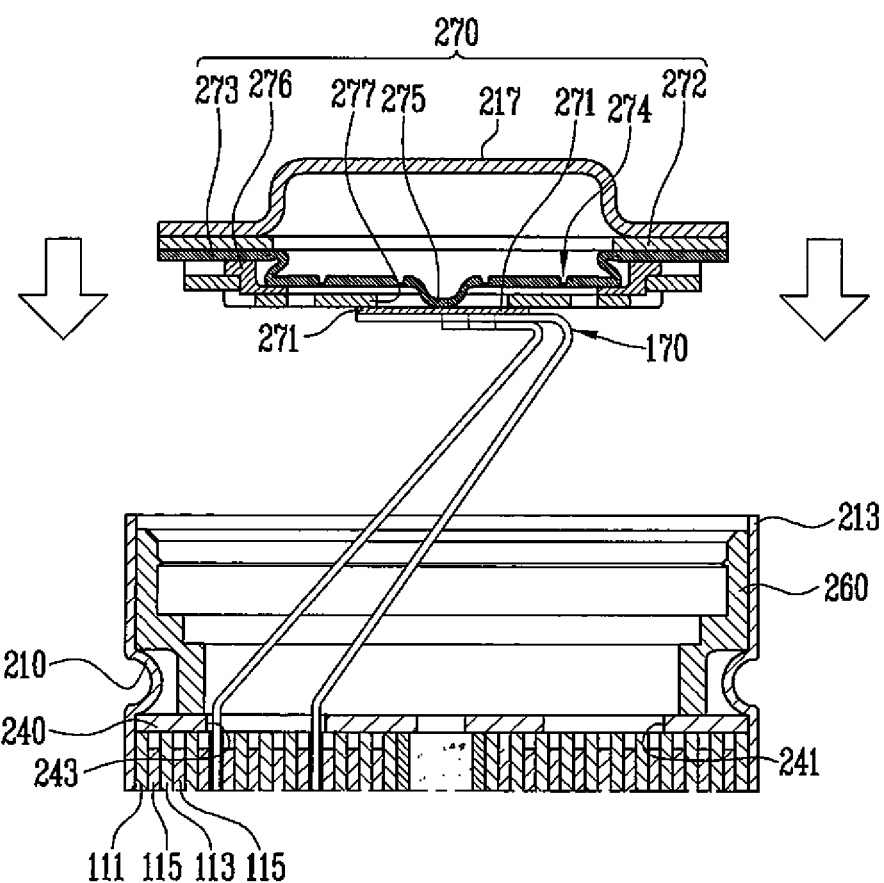
FIG. 7 is a sectional view showing a state in which the cap assembly joined as shown in FIG. 6 is coupled to an opening of a can.

FIG. 6 is a perspective view showing a state in which the inner tab 171 is joined with the cap assembly 270. FIG. 7 is a sectional view showing a state in which the cap assembly 270, which is joined with the inner tab 171, is coupled to the opening of the can 200. In the plurality of first electrode tabs 170, as shown in FIG. 3, the outer tab 176 is extended (e.g., bent) toward the inner tab 171 and then joined to the inner tab 171. For instance, the inner tab 171 and the outer tab 176 may be connected to each other through welding. After that, as shown in FIG. 6, a welding area 60 partially welded to the plate 271 or the cap-down 277 is formed at the cap assembly connection portion 171E of the inner tab that is to be fixed to the cap assembly 270.

When the cap assembly 270 and the inner tab 171 are connected to each other, the cap assembly 270, as shown in FIG. 7, may be inserted into the gasket 260 coupled to the opening of the can 200. The cap assembly 270 may be inserted into the gasket 260 such that the plate 271 faces the electrode assembly 100 and the cap-up 217 faces toward the outside. When the cap assembly 270 is inserted into the gasket 260, the opening of the can 200 may be clamped to form the clamping portion 213, so that the gasket 260 is closely connected to the outer circumference of the cap-up 217.

In FIG. 4, it is illustrated that the inner tab is fixed to the cap assembly, but the present disclosure is not limited thereto. This will be described in detail with reference to FIGS. 8 and 9.

Figure 8:
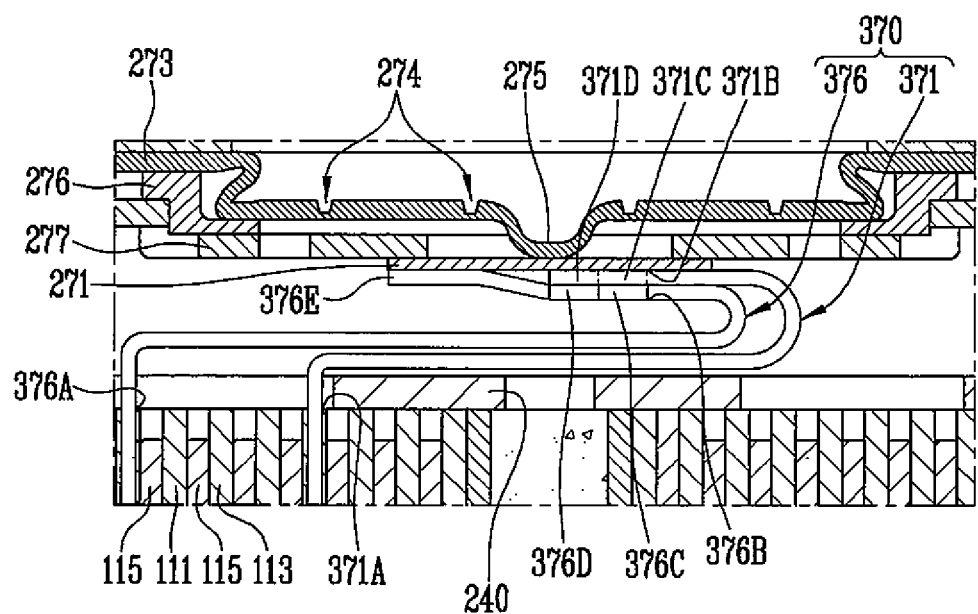
FIG. 8 is an enlarged sectional view showing a configuration in which a plurality of electrode tabs and a cap assembly are connected to each other in a secondary battery according to another embodiment of the present disclosure.

FIG. 8 is a partial sectional view of a secondary battery to which a modification of the plurality of first electrode tabs described above with reference to the embodiment illustrated in FIGS. 1-7 is applied according to another embodiment of the present disclosure. The secondary battery according to this embodiment includes an electrode assembly, a plurality of insulating plates, a center pin, a can accommodating the electrode assembly therein, and a gasket and a cap assembly, which seal an opening of the can.

The plurality of insulating plates, the center pin, the can accommodating the electrode assembly, and the gasket and the cap assembly, which seal the opening of the can, have the same configuration as the plurality of insulating plates 230 and 240, the center pin 250, the can 200, the gasket 260, and the cap assembly 270, which are described above with reference to FIGS. 1 to 7. Therefore, like components are designated by like reference numerals, and their detailed descriptions will be omitted below.

The electrode assembly includes first and second electrodes 113 and 111 and a separator 115, and the first electrode 113, the separator 115, and the second electrode 111 are sequentially stacked and then wound. The first and second electrodes 113 and 111 and the separator 115 have the same configuration as described above with reference to FIGS. 1 to 7. Therefore, like components are designated by like reference numerals, and their detailed descriptions will be omitted below.

The electrode assembly includes a plurality of first electrode tabs 370 electrically connected to the first electrode 113 and one second electrode tab electrically connected to the second electrode 111. The second electrode tab has the same configuration as the second electrode tab 190 described above with reference to FIGS. 1 to 7, and therefore, its detailed description will be omitted below.

The plurality of first electrode tabs 370 includes an inner tab 371 located relatively closer (e.g. proximate) to the center axis of the electrode assembly and an outer tab 376 located relatively farther (e.g., distal or offset) from the center axis of the electrode assembly. In other words, the inner tab 371 is located relatively farther from the outer circumference of the electrode assembly, and the outer tab 376 is located relatively closer to the outer circumference of the electrode assembly. The inner tab 371 and the outer tab 372 are aligned such that their portions extending to the outside from the electrode assembly overlap with each other.

The inner tab 371 and the outer tab 376 extend from the electrode assembly to a space between the electrode assembly and the cap assembly, and then are connected to each other. The length from an extraction point 371A of the inner tab to a connection point 371B of the inner tab is shorter than the length from an extraction point 376A of the outer tab to the connection point 376B of the outer tab.

Like the embodiment of FIG. 1, the inner tab 371 and the outer tab 376 are bent twice and are connected to each other. The inner tab 371 includes a connection area 371C further extending from the connection point 371B of the inner tab. The connection area 371C of the inner tab 371 is joined and fixed to the outer tab 376. The outer tab 376 includes a connection area 376C further extending from the connection point 376B of the outer tab. The connection area 376C of the outer tab 376 is joined and fixed to the connection area 371C of the inner tab 371.

The connection area 371C of the inner tab and the connection area 376C of the outer tab are located at regions that do not reach the center axis of the cap assembly (e.g., the connection areas 371C and 376C do not extend to the center axis of the cap assembly). The connection area 371C of the inner tab and the connection area 376C of the outer tab may be joined together through welding (e.g., ultrasonic welding) or any other suitable manufacturing process.

The inner tab 371 includes an extending end portion 371D further extending from the connection area 371C of the inner tab. The outer tab 376 includes extending end portions 376D and 376E further extending from the connection area 376C of the outer tab. The extending end portion of the outer tab, which is to be connected (e.g., fixed) to the cap assembly, extends longer than the extending end portion of the inner tab. The extending end portion of the outer tab 376 extends in a radial direction toward the outer circumference of the electrode assembly by passing through the center axis of the cap assembly, i.e., the axis corresponding to a protruding portion 275 of a vent.

In the illustrated embodiment, the extending end portions of the outer tab 376 includes a portion 376D overlapped by the extending end portion 371D of the inner tab and a cap assembly connection portion 376E further extending from the overlapped portion 376D that is to be joined with the cap assembly. The cap assembly connection portion 376E is not overlapped by the inner tab 371, but the cap assembly connection portion 376E is joined and fixed to a plate 271 or a cap-down 277. In FIG. 8, it is illustrated that the cap assembly connection portion 376E is connected to the plate 271, but the present disclosure is not limited thereto.

The cap assembly connection portion 376E of the outer tab is located at the opposite side of the connection area 376C of the outer tab with respect to the center axis of the cap assembly (i.e., the center axis of the cap assembly is interposed between the cap assembly connection portion 376E and connection area 376C of the outer tab). That is, the portion of the outer tab 376 joined to the inner tab 371 and the portion of the outer tab 176 joined to the cap assembly are located at the opposite sides with respect to the center axis of the cap assembly. The extending end portion 371D of the inner tab overlaps the outer tab, and is not joined to the cap assembly. The portion of the outer tab 376 joined to the inner tab and the portion of the outer tab 376 joined to the cap assembly may be located at one side (the same side) with respect to the center axis of the cap assembly.

Figure 9:
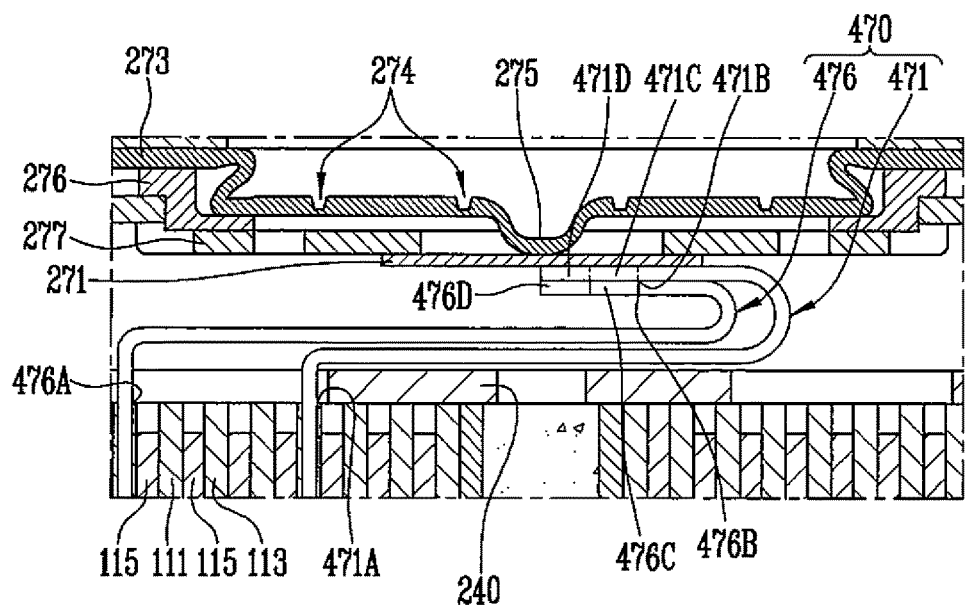
FIG. 9 is an enlarged sectional view showing a configuration in which a plurality of electrode tabs and a cap assembly are connected to each other in a secondary battery according to still another embodiment of the present disclosure.

The embodiment of FIG. 1 shows a case where the inner tab of the inner and outer tabs is fixed to the cap assembly, and the embodiment of FIG. 8 shows a case where the outer tab of the inner and outer tabs is fixed to the cap assembly. However, the present disclosure is not limited thereto. As shown in FIG. 9, the extending portions of the inner and outer tabs may extend the same length and be joined together with the cap assembly.

Referring to FIG. 9, a plurality of first electrode tabs 470 include an inner tab 471 and an outer tab 476 relatively closer to the outer circumference of the electrode assembly than the inner tab 471. The inner tab 471 and the outer tab 476 extend out from the electrode assembly to a space between the electrode assembly and the cap assembly, and then are connected to each other. The inner and outer tabs are also bent to overlap with each other. The length from an extraction point 471A of the inner tab to a connection point 471B of the inner tab is shorter than the length from an extraction point 476A of the outer tab to a connection point 476B of the outer tab.

Like the embodiment of FIG. 1, the inner tab 471 and the outer tab 476 are bent twice and are connected to each other. The inner tab 471 includes a connection area 471C further extending from the connection point 471B of the inner tab. The connection area 471C is joined and fixed to the outer tab 476. The outer tab 476 includes a connection area 476C further extending from the connection point 476B of the outer tab. The connection area 476C is joined and fixed to the connection area 471C of the inner tab 471.

The inner tab 471 includes an extending end portion 471D further extending from the connection area 471C of the inner tab. The outer tab 476 includes an extending end portion 476D further extending from the connection area 476C of the outer tab. The extending end portion 471D of the inner tab and the extending end portion 476D of the outer tab extend the same length, and are joined and fixed to the plate 271 or the cap-down 277. In one or more alternate embodiments, the extending end portion 471D of the inner tab and the extending end portion 476D of the outer tab may not be provided or may be substantially not provided, and the connection area 471C of the inner tab and the connection area 476C of the outer tab may be joined together and to the plate 271 and/or the cap-down 277. For instance, the inner and outer tabs 471 and 476 may be welded together and to the cap assembly in the connection areas.

In addition, the plurality of first electrode tabs 370 or 470 may further include insulating layers as described with reference to the plurality of first electrode tabs 170 in the embodiment of FIG. 1.

In the above-described embodiments, the inner tab 171, 371, or 417 and the outer tab 176, 376, or 476 have the same width, but the present disclosure is not limited thereto. The widths of the inner and outer tabs may be different from each other. This will be described in more detail below with reference to FIGS. 10 and 11.

FIG. 9 is an enlarged sectional view showing a configuration in which a plurality of electrode tabs and a cap assembly are connected to each other in a secondary battery according to still another embodiment of the present disclosure.

Figure 10:
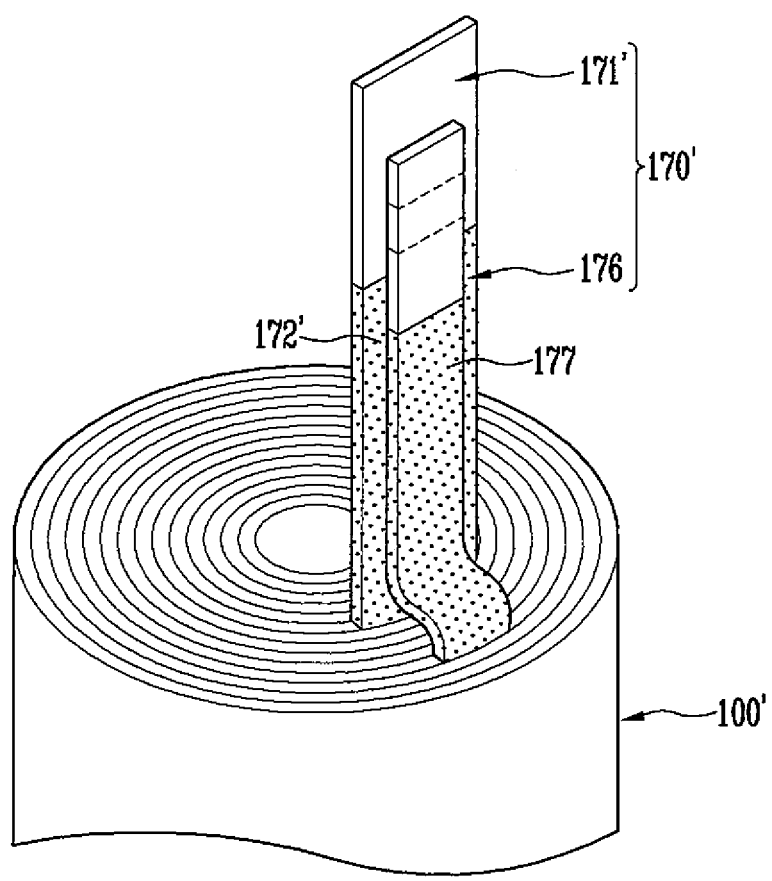
FIG. 10 is an enlarged perspective view of a plurality of first electrode tabs provided in a secondary battery according to still another embodiment of the present disclosure.

FIG. 10 illustrates, as still another embodiment, a plurality of first electrode tabs 170' in which the widths of the inner and outer tabs in the embodiment of FIG. 1 are different from each other. In an electrode assembly 100' of this embodiment, the width of the inner tab 171' of the plurality of first electrode tabs 170' is formed wider than the width of the outer tab 176, and the other components are the same as described above.

Figure 11:
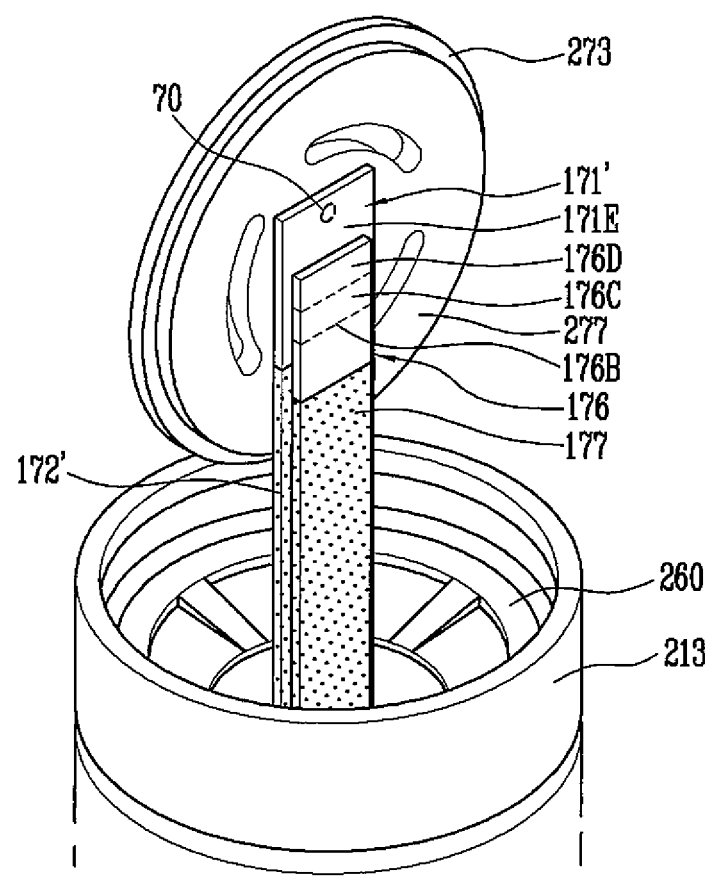
FIG. 11 is a perspective view showing a state in which the plurality of first electrode tabs of the embodiment of FIG. 10 and a cap assembly are joined with each other.

Referring to FIG. 11, an extending end portion of the inner tab 171' is connected to the cap assembly through welding. A welding area 70 is formed at the extending end portion of the inner tab 171' that is joined with the plate or the cap-down.

According to the above-described configuration in which the inner tab is wider than the outer tab, the inner tab and the outer tab can be more easily aligned to overlap each other. Also, because the inner tab is a tab joined with the cap assembly, the above-described configuration in which the inner tab is wider than the outer tab may facilitate ease of joining the inner tab to the cap assembly.

As another embodiment, in the embodiment of FIG. 8, the width of the outer tab 376 may be wider than the width of the inner tab 371.

In the above-described embodiments, it is illustrated that only one second electrode tab is provided, but the present disclosure is not limited thereto. In still another embodiment, the second electrode tab may include a plurality of second electrode tabs. This will be described in more detail with reference to FIG. 12.

Figure 12:
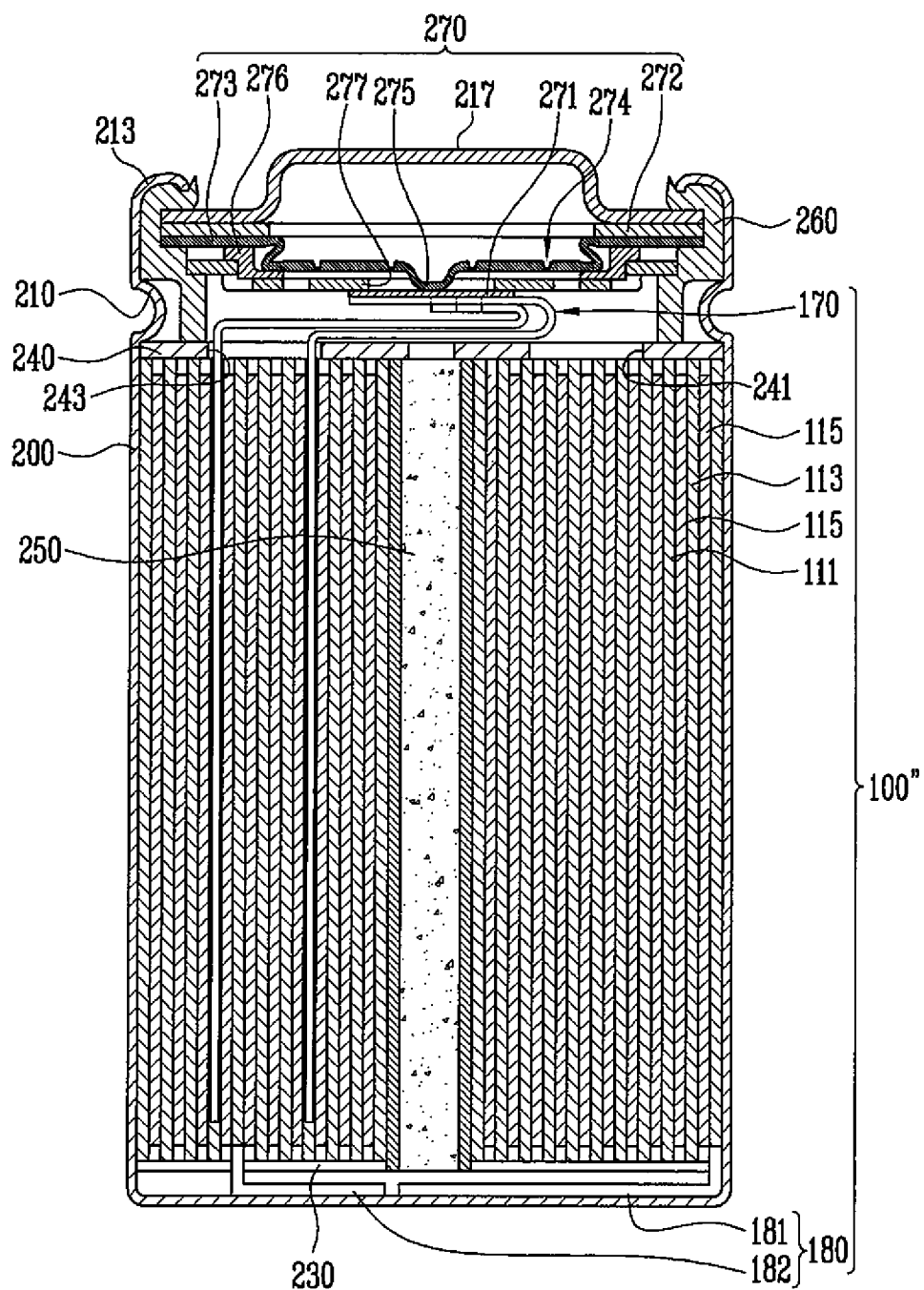
FIG. 12 is a sectional view of a secondary battery according to still another embodiment of the present disclosure.

FIG. 12 shows still another embodiment of the present disclosure, which is a sectional view of a secondary battery provided with a plurality of first electrode tabs 170 and a plurality of second electrode tabs 180. The secondary battery of the embodiment of FIG. 12 has the same configuration as the secondary battery described with reference to FIGS. 1 to 7, except that the second electrode tab 180 includes a plurality of tabs. Therefore, like components are designated by like reference numerals, and their detailed descriptions will be omitted. The secondary battery of the embodiment of FIG. 12 has the same external configuration as the secondary battery 10 shown in FIG. 1, and the section taken along line I-I' of FIG. 1 is shown in FIG. 12.

The secondary battery of FIG. 12 includes an electrode assembly 100" including a plurality of first electrode tabs 170 and a plurality of second electrode tabs 180. The electrode assembly 100" includes first and second electrodes 113 and 111 and a separator 115, and the separator 115 is interposed between the first and second electrodes 113 and 111. The first and second electrodes and the separator are the same as in the above-described embodiment. Therefore, like components are designated by like reference numerals, and their detailed descriptions will be omitted.

The electrode assembly 100" includes a plurality of first electrode tabs 170 electrically connected to the first electrode 113 and a plurality of second electrodes 180 electrically connected to the second electrode 111. Energy generated from the electrode assembly 100" is transmitted to the outside by the first and second electrodes 170 and 180. The first and second electrode tabs include a conductive material, and, for example, may include nickel (Ni) or Ni alloy.

The plurality of first electrode tabs 170 have the same configuration as those described with reference to FIGS. 1 to 7, and therefore, their detailed descriptions will be omitted. The plurality of second electrode tabs 180 extends to the outside of the electrode assembly 100" opposite the plurality of first electrode tabs 170, and is electrically connected to the can 200. In other words, the plurality of first electrode tabs 170 extend toward the cap assembly, and the plurality of second electrode tabs 180 extend toward the bottom surface of the can, which is opposite the cap assembly.

The plurality of second electrode tabs 180 includes an inner tab 182 relatively closer (e.g., proximate) to the center axis of the electrode assembly 100" and an outer tab 181 relatively farther (e.g., distal) from the center axis of the electrode assembly 100".

Each of the inner and outer tabs 182 and 181 of the second electrode tabs is bent in the inner radial direction of the electrode assembly and joined to the bottom surface of the can 200. The inner and outer tabs 182 and 181 of the second electrode tabs may be joined to the can 200 through welding.

Similarly, each of the embodiments of FIGS. 8 and 9 may be provided with a plurality of second electrode tabs as described above.

In the above-described embodiments, it is illustrated that the number of plurality of first electrode tabs 170 is two. However, the number of first electrode tabs is not limited thereto, and the present disclosure may also be applied to a case where the number of plurality of first electrode tabs is two or more.

As another embodiment, when the number of the plurality of first electrode tabs is three, an intermediate tab aligned with the inner and outer tabs may be further provided between the above-described inner and outer tabs 171 and 176. The intermediate tab is also connected to the first electrode 113. The intermediate tab extends toward the cap assembly to the outside of the electrode assembly and is connected to the inner and outer tabs.

The length from a point at which the intermediate tab extends from the electrode assembly to a point at which the intermediate tab is connected to the inner and outer tabs is different from the length from a point at which each of the inner and outer tabs extend from the electrode assembly to a point at which the inner and outer tabs are connected to each other. In one embodiment, the length from a point at which the intermediate tab extends from the electrode assembly to a point at which the intermediate tab is connected to the inner and outer tabs may be longer than the length from the extraction point of the inner tab to the connection point of the inner tab, and shorter than the extraction point of the outer tab to the connection point of the outer tab.

At least one tab among the inner tab, the intermediate tab, and the outer tab may be fixed to the cap assembly, and the extending end portion of the tab fixed to the cap assembly may be longer than the extending end portion of the tab not fixed to the cap assembly.

In one or more alternate embodiments, the extending portion of the tab not fixed to the cap assembly among the inner tab, the intermediate tab, and the outer tab may be omitted and joined to the tab fixed to the cap assembly through any suitable process (e.g., welding). In one embodiment, the tab fixed to the cap assembly is joined to the cap assembly at the extending end portion thereof.

According to the present disclosure, the plurality of first electrode tabs are electrically connected to the first electrode provided in the electrode assembly, so that it is possible to reduce resistance and thereby improve output characteristics of the secondary battery.

Also, according to the present disclosure, in the plurality of first electrode tabs, the length from a point at which one tab extends from the electrode assembly to a point at which the one tab is connected to another tab is different from the length from a point at which the another tab extends from the electrode assembly to a point at which the another tab is connected to the one tab, so that it is possible to prevent or at least mitigate the risk of the plurality of first electrode tabs being broken apart (e.g., separated), such as, for instance, due to impact.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and equivalents thereof.

What is claimed is:

1. A secondary battery comprising:
an electrode assembly including a first electrode, a separator, and a second electrode, which are sequentially stacked and wound,
a cap assembly electrically connected to the first electrode,
a plurality of first electrode tabs electrically connected to the first electrode, the plurality of first electrode tabs extending to an outside of the electrode assembly,
wherein the plurality of first electrode tabs includes:
an inner tab located proximate to a center axis of the electrode assembly; and
an outer tab located distal to the center axis of the electrode assembly relative to the inner tab, the outer tab being connected to the inner tab at the outside of the electrode assembly,
wherein a length along the inner tab from a point at which the inner tab extends from the electrode assembly to a point at which the inner tab is connected to the outer tab is different from a length along the outer tab from a point at which the outer tab extends from the electrode assembly to a point at which the outer tab is connected to the inner tab,
wherein the inner tab and the outer tab are connected together at a connection area,
wherein the inner and outer tabs include first bending areas extending in a first radial direction from the points at which the inner and outer tabs extend from the electrode assembly, and second bending areas extending in a second radial direction opposite the first radial direction, and
wherein the inner tab comprises an extension portion extending in the second radial direction from the connection area, the extension portion of the inner tab extending beyond the outer tab and being connected to the cap assembly.

2. The secondary battery of claim 1, wherein the inner tab and the outer tab are aligned at a same side relative to the center axis of the electrode assembly.

3. The secondary battery of claim 1, wherein the length along the inner tab from the point at which the inner tab extends from the electrode assembly to the point at which the inner tab is connected to the outer tab is shorter than the length along the outer tab from the point at which the outer tab extends from the electrode assembly to the point at which the outer tab is connected to the inner tab.

4. The secondary battery of claim 1, wherein the inner tab and the outer tab have different widths from each other.

5. The secondary battery of claim 1, wherein the electrode assembly further includes at least one second electrode tab electrically connected to the second electrode, the at least one second electrode tab extending to the outside of the electrode assembly.

6. A secondary battery comprising:
an electrode assembly including a first electrode, a separator, and a second electrode, which are sequentially stacked and wound; and
a case including a cap assembly electrically connected to the first electrode, the case accommodating the electrode assembly therein,
a plurality of first electrode tabs electrically connected to the first electrode, the plurality of first electrode tabs extending to an outside of the electrode assembly to be electrically connected to the cap assembly,
wherein the plurality of first electrode tabs includes:
an inner tab located proximate to a center axis of the electrode assembly; and
an outer tab located distal to the center axis of the electrode assembly relative to the inner tab, the outer tab being connected to the inner tab at the outside of the electrode assembly,
wherein a length along the inner tab from a point at which the inner tab extends from the electrode assembly to a point at which the inner tab is connected to the outer tab is different from a length along the outer tab from a point at which the outer tab extends from the electrode assembly to a point at which the outer tab is connected to the inner tab,
wherein the inner tab and the outer tab are connected together at a connection area,
wherein the inner and outer tabs include first bending areas extending in a first radial direction from the points at which the inner and outer tabs extend from the electrode assembly and second bending areas extending in a second radial direction opposite the first radial direction, and
wherein the inner tab comprises an extension portion extending in the second radial direction from the connection area, the extension portion of the inner tab extending beyond the outer tab and being connected to the cap assembly.

7. The secondary battery of claim 6, wherein the inner tab and the outer tab extend between the electrode assembly and the cap assembly, and wherein the first and second bending areas are between the points at which the inner tab and the outer tab extend from the electrode assembly and the connection area at which the inner and outer tab are connected to each other.

8. The secondary battery of claim 7, wherein the cap assembly is spaced apart from the electrode assembly and above the electrode assembly, and
wherein the point at which the inner and outer tab are connected to each other is located above the first bending areas of the inner tab and the outer tab.

9. The secondary battery of claim 8, wherein the cap assembly includes:
a cap-up; and
a current interrupt device provided between the electrode assembly and the cap-up, the current interrupt device electrically connected to the cap-up, and
wherein at least one of the inner tab or the outer tab is fixed to the current interrupt device.

10. The secondary battery of claim 6, wherein the inner tab and the outer tab have different widths from each other.

11. The secondary battery of claim 10, wherein one tab of the inner tab and the outer tab that has a wider width than the other tab of the inner tab and the outer tab is fixed to the cap assembly.

12. The secondary battery of claim 6, wherein the case further includes a can forming an exterior of the case, the can accommodating the electrode assembly therein, the can having an opening to which the cap assembly is coupled, and
   wherein the electrode assembly further includes at least one second electrode tab electrically connected to the second electrode, the at least one second electrode tab extending to the outside of the electrode assembly to be electrically connected to the can.

13. The secondary battery of claim 6, wherein the inner tab and the outer tab are aligned at a same side with respect to the center axis of the electrode assembly, and wherein the inner tab and the outer tab overlap each other.

14. The secondary battery of claim 7, wherein: the first bending areas are bent in an inner radial direction of the electrode assembly and the second bending areas are spaced apart from the first bending areas and are bent toward the point at which the inner tab and the outer tab are connected to each other.

* * * * *